March 31, 1942. A. MÜLLER 2,277,933
VACUUM CLEANER
Filed April 26, 1939

INVENTOR
Arthur Müller
BY Thomas C. Betts
his ATTORNEY

Patented Mar. 31, 1942

2,277,933

UNITED STATES PATENT OFFICE 2,277,933

VACUUM CLEANER

Arthur Müller, Berlin-Johannisthal, Germany, assignor to Electrolux Corporation, Dover, Del., a corporation of Delaware Application April 26, 1939, Serial No. 270,081
In Germany May 2, 1938

8 Claims. (Cl. 248—2)

My invention relates to vacuum cleaners and more particularly to an improved arrangement for securing a motor-fan unit within a casing or housing of a vacuum cleaner.

Among the objects of my invention is to provide means for securing the motor-fan unit in place without requiring the use of bolts or other similar fastening elements, thus increasing the speed of the assembly of the device as well as increasing the ease with which the motor-fan unit may be removed for purposes of inspection and repair.

In accordance with my invention members are movably mounted on the motor-fan unit and means are provided for expanding these members against the inner surfaces of the casing so as to securely clamp the unit in place.

Figure 1:
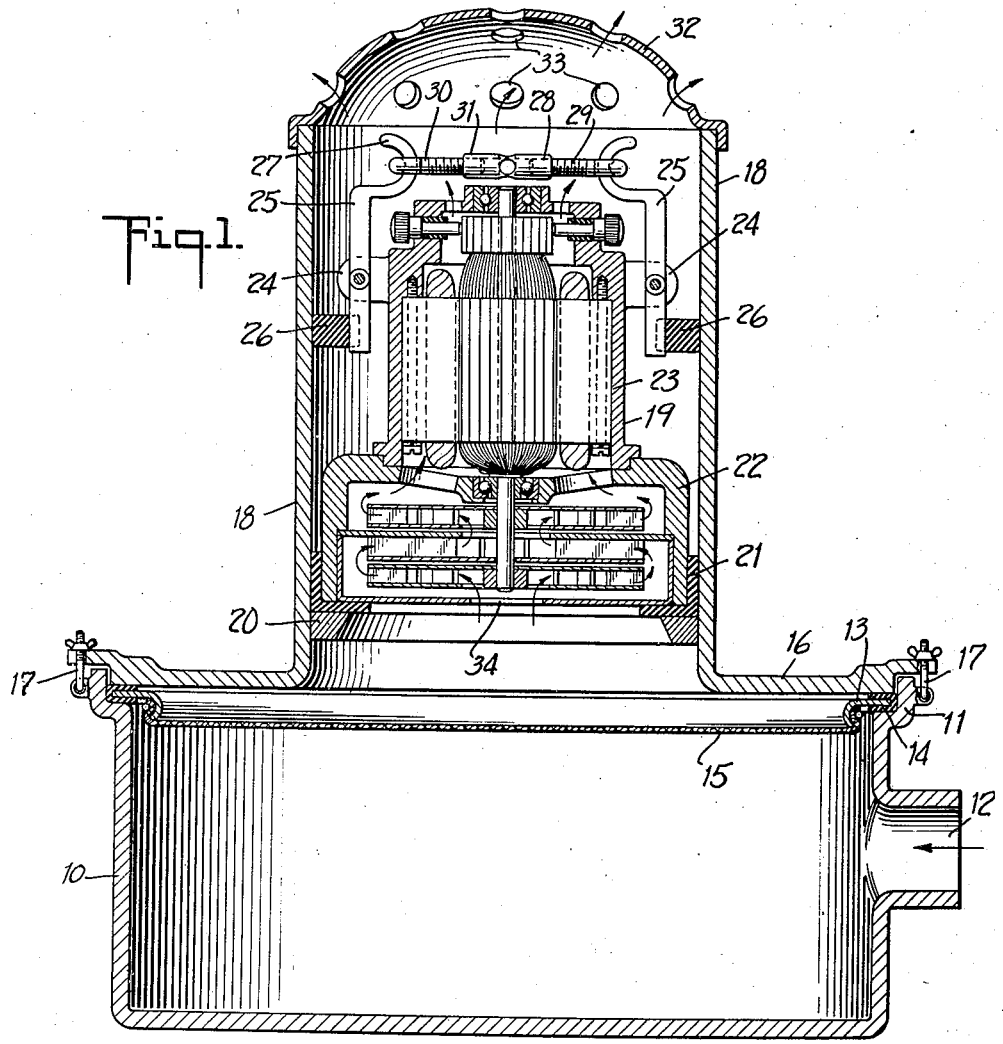
Figure 2:
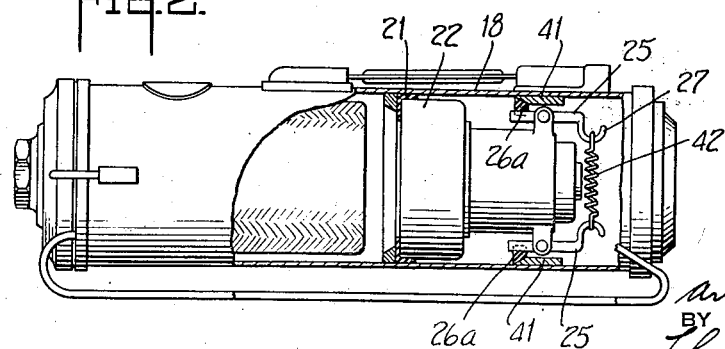

Further objects and advantages of my invention will be apparent from the following description considered in connection with the accompanying drawing, which forms a part of this specification and of which Fig. 1 is a cross-sectional view of one embodiment of my invention and Fig. 2 is a cross-sectional view of another embodiment.

Referring more particularly to Fig. 1, reference character 10 designates a hollow receptacle having an open upper end surrounded by a bell mouth 11. An inlet opening 12 is formed in one of the side walls of receptacle 10. A ring 13, provided with a gasket of rubber and the like 14 is received in the bell mouth 11. Ring 13 supports a piece of material 15 such as cloth having a weave which permits the flow therethrough of air, but is impervious with respect to dust. An annular plate 16 rests on gasket 14 and is clamped in air-tight relation therewith by means of a clamping arrangement 17, which also removably secures plate 16 to receptacle 10. Integral with or secured to plate 16 is a cylindrical casing 18 within which is mounted a motor-fan unit designated generally by reference character 19. A ring 20 is secured within barrel 18 and provides therein an annular ledge. A gasket 21 of rubber or other suitable material is disposed immediately above ledge 20. Received within the gasket is the lower end of a fan housing 22, which forms part of the motor-fan unit 10. Secured to fan housing 22 is the motor housing 23. Brackets 24 are provided on opposite sides of the upper end of the motor housing and serve to pivotally support arms 25.

The lower end of each arm 25 carries a piece of material 26 which has a high coefficient of friction. Such material may be rubber, felt, leather or the like. The upper ends of arms 25 are formed as hooks 27 and are connected together by means of a turn-buckle 28. This turn-buckle includes threaded bolts 29 and 30 formed with eyes which engage the hooks 27. The bolts engage threaded bores in a block 31. One of the bolts is provided with a reverse thread, whereby rotation of the block 31 in one direction draws both of the hooks 27 together.

The upper end of cylindrical member 17 may be provided with a cover 32 formed with openings 33 for the escape of air.

In order to assemble the motor-fan unit within the housing 18, the cover 32 being removed, it is only necessary to insert the unit through the open upper end of the casing until the lower end of the fan housing 22 rests on the gasket 21. Thereupon the block 31 is rotated so as to draw the hooked ends 27 of the arms 25 towards each other. This causes the opposite ends of the arms to move outwardly and the friction material 26 carried thereby engages the interior surfaces of the casing 18 to thus hold the motor-fan unit securely in place. In order to remove the unit, it is only necessary to rotate the block 31 of the turn-buckle in the opposite direction, whereupon the friction material 26 is released from engagement within the casing and the unit may be lifted out.

In operation, rotation of the fan within the housing 22 by means of electric motor draws air in through the inlet opening 12 in the receptacle 10. If this inlet is connected by means of a hose or the like to a suction nozzle, and the nozzle is passed over a dusty surface, dust will be entrained in the air entering the receptacle 10. The dust separating member 15 prevents the passage therethrough of this dust, while permitting the air to flow to the inlet 34 of the fan. From the fan the air is passed through the motor-housing and flows through the opening 33 in the cover 32 to the atmosphere.

The arrangement shown in Fig. 2 is particularly well suited for use in a vacuum cleaner in which the cylindrical casing is ordinarily disposed with its axis in a horizontal direction. Under this condition the weight of the motor-fan unit does not act to hold the end of the fan housing 22 against the gasket 21. However, in the arrangement shown in Fig. 2 each piece of frictional material 26a is provided with an inclined surface which engaged similarly inclined surfaces formed on members 41 secured within casing 18.

In this figure the turn-buckle 31 has been replaced by a comparatively strong spring 42 which is connected between the hooked ends 27 of the arms 25.

Due to the above mentioned inclined surfaces, when the spring 42 acting on the arms 25 causes the friction material 26a to be projected outwardly, the motor-fan unit is subjected to a force tending to move it to the left, as viewed in Fig. 2. This forces the end of the motor-fan unit 22 tightly against the gasket 21 and the unit is held securely in place within the casing 18.

It will be appreciated that the turn-buckle 28 and the spring 42 are interchangeable and either one may be employed in either of the embodiments. While I have shown and described two preferred embodiments of my invention, it is to be understood that this has been done for purposes of illustration only and that my invention is not to be limited thereto, but its scope is to be determined by the appended claims.

What I claim is:

1. In a vacuum cleaner, a hollow casing, a member within said casing, a plurality of arms pivotally mounted on said member between the member and the casing, and means extending between corresponding ends of said arms for moving said ends towards each other to thereby urge the opposite ends into engagement with surfaces formed on the interior of said casing to clamp the member securely in place therein.

2. In a vacuum cleaner, a hollow casing, a member within said casing, means for supporting one end of said member in said casing, a plurality of arms pivotally mounted on said member between the member and the casing, one end of each arm being provided with material having a high coefficient of friction, and means connected to the opposite ends of said arms for moving them towards each other to thereby urge said material into frictional engagement with surfaces formed on the interior of said casing to clamp the member securely in place therein.

3. In a vacuum cleaner, a hollow casing, a member within said casing, means for supporting one end of said member in said casing, a plurality of arms pivotally mounted on said member between the member and the casing, and resilient means connected to one end of each arm for urging said ends towards each other to thereby urge the opposite ends into engagement with surfaces formed on the interior of said casing to clamp the member securely in place therein.

4. In a vacuum cleaner, a hollow casing, a member within said casing, means for supporting one end of said member in said casing, diametrically disposed arms pivotally mounted on said member between the member and the casing, and a turn-buckle connected to one end of each arm for drawing said ends together to thereby urge the opposite ends into engagement with the interior of said casing to clamp the member securely in place therein.

5. In a vacuum cleaner, a hollow casing having a vertically extending axis, a member within said casing, means extending inwardly from said casing to support the lower end of said member, a plurality of arms pivotally mounted on said member adjacent to the upper end thereof and between said member and the casing, and means for moving one end of each lever inwardly to thereby urge the opposite ends into engagement with the interior of said casing to clamp the member securely in place therein.

6. In a vacuum cleaner, a hollow casing, a member within said casing, means extending inwardly from said casing beyond one end of said member, a plurality of arms pivotally mounted on said member adjacent to the opposite end thereof and between said member and the casing, one end of each of said arms having a surface inclined with respect to a plane transverse to said casing, said casing being formed with corresponding inclined surfaces, and means for urging the inclined surfaces on said arms into contact with the inclined surfaces on said casing to thereby force said one end of said member against said inwardly extending means.

7. In a vacuum cleaner, a hollow casing, a member within said casing, means for supporting one end of said member in said casing, an arm pivotally mounted at a point intermediate its ends on said member between the member and the casing, means on the opposite side of said member from said arm providing an abutment between said member and said casing, and means independent of said casing and engaging one end of said arm for moving said end so that the other end thereof engages an interior surface of said casing to clamp the member securely in place therein.

8. In a vacuum cleaner, a hollow casing, a member within said casing, means for supporting one end of said member in said casing, a plurality of arms pivotally mounted on said member between the member and the casing, and means for moving corresponding ends of said arms towards each other to thereby urge the opposite ends into engagement with surfaces formed on the interior of said casing to clamp the member securely in place therein.

ARTHUR MÜLLER.